(12) United States Patent  
Carter (10) Patent No.: US 7,183,746 B1  
(45) Date of Patent: Feb. 27, 2007

(54) CART CHARGE SYSTEM (76) Inventor: Darrell L Carter, 911 State Route 222, Cortland, NY (US) 13045

( * ) Notice: Subject to any disclaimer, the term of this patent is extended or adjusted under 35 U.S.C. 154(b) by 182 days.

(21) Appl. No.: 10/929,877

(22) Filed: Aug. 30, 2004

(51) Int. Cl.
*H02J 7/00* (2006.01)
*H02J 7/14* (2006.01)
*B60K 1/00* (2006.01)

(52) U.S. Cl. .............. 320/116; 320/123; 180/65.3; 180/65.4

(58) Field of Classification Search .......... 320/116, 320/123; 180/65.3, 65.4; 307/9.1, 10.1, 307/10.7; 318/432, 434, 139
See application file for complete search history.

(56) References Cited

U.S. PATENT DOCUMENTS

| 825,276 | A | 7/1906 | Lemp |
|---|---|---|---|
| 932,312 | A | 8/1909 | Nilson |
| 1,111,510 | A | 9/1914 | Ward |
| 1,207,658 | A | 12/1916 | Swain |
| 3,171,505 | A | 3/1965 | Imelmann |
| 3,517,766 | A | 6/1970 | West |
| 3,796,278 | A | 3/1974 | Shibata |
| 3,917,017 | A | 11/1975 | Deane |
| 5,867,009 | A | 2/1999 | Kiuchi et al. |
| 6,441,581 | B1 * | 8/2002 | King et al. ............. 320/101 |
| 6,481,516 | B1 | 11/2002 | Field et al. |
| 6,982,499 | B1 * | 1/2006 | Kachi et al. ............ 307/75 |
| 2002/0167291 | A1 * | 11/2002 | Imai et al. ............ 320/119 |

FOREIGN PATENT DOCUMENTS

| EP | 1.020.319 | 7/2000 |
|---|---|---|
| GB | 2.371.688 | 7/2002 |

* cited by examiner

*Primary Examiner*—Karl Easthom
*Assistant Examiner*—Alexis Boateng
(74) *Attorney, Agent, or Firm*—Michael I Kroll (57) ABSTRACT

A charging mechanism includes means for generating electrical current and means connected to the generating means for distributing the generated current. At least one battery bank formed from a plurality of batteries is connected in series. A means for charging the batteries is connected between the bank and the distribution means. A voltage controller controls a voltage level provided by at least one battery bank from at least one of exceeding and falling below a predetermined voltage level. Upon the controlling means detecting the voltage level is below the predetermined voltage level, the controlling means causes the generating means to generate the electric current to be provided to at least one battery bank by the distribution means and the charging means charges at least one battery bank.

5 Claims, 7 Drawing Sheets

CART CHARGE SYSTEM

BACKGROUND OF THE INVENTION

1. Field of the Invention

The present invention relates generally to battery-charging systems and, more specifically, to a battery-charging system designed for use with an electric vehicle. The battery charging system of the present invention provides a charging circuit onboard the vehicle. The onboard charging system of the present invention provides means to continuously charge the batteries without the need to stop the vehicle. The battery charging system includes a power generator, a distribution system, battery bank, controller and a direct current motor. The wiring of the battery charging system provides means for a charging circuit for onboard electric vehicle batteries, where the batteries are charged in parallel while being used in series. A controller regulates the voltage to flow maintain necessary current and prevents overcharging of the batteries.

2. Description of the Prior Art

Electric cars are of increasing interest of people today. There are several reasons for the continuing interest in these vehicles. One main reason for such interest is the need reduce pollutants and improve air quality, especially in the in urban areas. Electric cars create less pollution than gasoline-powered cars used today, so they are an environmentally friendly alternative to gasoline-powered vehicles.

Electric cars in use today have had limited success. One concern with electric powered vehicles continues to be the batteries. The electrical car batteries used today presents significant problems in that they have a limited capacity, require an external power source to recharge the batteries, and are slow to recharge. In turn, today's technology results in electric vehicles with short driving distances and considerable down time between charges.

There are other and battery-charging systems designed for use with an electric vehicle. Typical of these is U.S. Pat. No. 825,276 issued to H. Lemp on Jul. 3, 1906.

Another patent was issued to L. G. Nilson on Aug. 24, 1909 as U.S. Pat. No. 932,312 and on Sep. 22, 1914, U.S. Pat. No. 1,111,510 was issued to C. A. Ward. Yet another U.S. Pat. No. 1,207,658 was issued to H. Swain on Dec. 5, 1916 and still yet another was issued on Mar. 2, 1965 to H. L. Imelmann as U.S. Pat. No. 3,171,505.

Another patent was issued to D. H. West on Jun. 30, 1970 as U.S. Pat. No. 3,517,766. Yet another U.S. Pat. No. 3,796,278 was issued to F. Shibata on Mar. 12, 1974. Another was issued to C. Deane on Nov. 4, 1975 as U.S. Pat. No. 3,917,017 and still yet another was issued on Feb. 2, 1999 to T. Kiuchi as U.S. Pat. No. 5,867,009.

B. Field was issued U.S. Pat. No. 6,481,516 on Nov. 19, 2001. In addition, the European patent office issued Patent No. EP 1020319 to Koike on Jul. 19, 2000 and Patent No. GB2371688 was issued to A. Phillips on Jul. 31, 2002.

U.S. Pat. No. 825,276

Inventor: H. Lemp

Issued: on Jul. 3, 1906

This invention relates to self-propelled vehicles, and has special reference to that class of vehicles which drives its motive power from an electric generator driven by a prime mover, such for instanced, as an internal combustion engine.

U.S. Pat. No. 932.312

Inventor: L. G. Nilson

Issued: Aug. 24, 1909

An object of this invention is to provide a generator unit wherein a storage battery may be used to assist the engine in case of overload, without being itself subject to fluctuating conditions of the working circuit. A further object of this invention is to provide in conjunction with such a generator unit, an improved system of control whereby a wide range of speed variation may be obtained without necessarily employing resistances in the working circuit or making it necessary to make and break the motor circuit.

U.S. Pat. No. 1,111,510

Inventor: C. A. Ward

Issued: Sep. 22, 1914

The principal object of this invention is to provide a construction and arrangement enabling the vehicle to be driven by electricity either from a storage battery, or from mechanism for developing electric power including a prime mover such as an engine.

U.S. Pat. No. 1,207,658

Inventor: H. Swain

Issued: Dec. 5, 1916

This invention relates to an electrically driven truck on which the electrical power is generated by means of generator operated by a gas engine or other suitable power and the energy stored in a battery and then utilized through a motor to drive one or more wheels as desired. The object thereof is to provide simple and efficient mechanism for that purpose in which a side pressure or friction on the axles is largely relieved by means of a balanced drive.

U.S. Pat. No. 3,171,505

Inventor: H. L. Imelmann

Issued: Mar. 2, 1965

An object of this invention is to provide and electric driving system for a vehicle that will enable the vehicle to get under way at idling speed of prime mover, and to accelerate when the prime mover accelerates. Another object of this invention is to provide an electric driving system whereas an internal combustion engine connected to en electric generator furnishes the vehicle.

U.S. Pat. No. 3,517,766

Inventor: D. H. West

Issued: Jun. 30, 1970

This invention relates to an electric vehicle and an electric power supply system for a battery-operated vehicle comprising a traction motor, and internal combustion engine driving a pair of electrical generators, and a battery. The battery is continuously charged by one generator and the traction motor has its field winding connected to the battery and its armature receives a variable voltage from the other generator.

U.S. Pat. No. 3,796,278

Inventor: F. Shibata

Issued: Mar. 12, 1974

An electric motor for driving a wheel of a vehicle may be arranged to be supplied with electric power, through a chopper control system using controlled rectifiers, from an electric battery group connected in parallel with an electric generator driven by a driving machine such as a prime mover. The efficiency of the driving system can be increased and the temperature rise of the electric battery can be kept low by providing an inductor which permits discharging D.C. current to flow from the electric battery and prevents charging current of high frequency from flowing to the electric battery.

U.S. Pat. No. 3,917,017

Inventor: C. Deane

Issued: Nov. 4, 1975

Two banks of series-connected batteries are alternately charged by an engine driven generator under control of a change-over selector. While one bank of batteries is being charged the other bank powers a drive motor for vehicle propulsion at a speed controlled by selection of power terminals in each battery bank, at different voltage levels, from which the drive motor is energized.

U.S. Pat. No. 5,867,009

Inventor: T. Kiuchi

Issued: Feb. 2, 1999

An electric power generating apparatus having an electric generator is mounted on a hybrid vehicle which has a propulsive electric motor powered by a battery and an internal combustion engine for actuating the electric generator to generate an electric power output to charge the battery. A goodness-of-fit calculator and a generator operational amount calculator determine an operational amount for the electric generator based on a membership function and fuzzy rules stored in a fuzzy reasoning memory according to fuzzy reasoning from vehicle operating conditions including a charged and discharged condition of the battery and a vehicle speed of the hybrid vehicle, detected by operating condition detectors.

U.S. Pat. No. 6,481,516

Inventor: B. Field

Issued: Nov. 19, 2002

A vehicle having an electric hybrid power system is provided. The vehicle includes an electric motor drivably connected to one or more ground engaging wheels. A battery pack stores electricity to power the electric motor. An engine is drivably connected to the wheels with an alternator connected to the engine for recharging an accessory battery. The alternator has at least a voltage output range of between approximately the standard output voltage of the accessory battery and the standard output voltage of the battery pack. In accordance with the present invention, a mechanism for electrically connecting the alternator to the battery pack is provided such that the alternator alternatively recharges both the battery pack and the accessory battery.

European Patent Number EP 1020319

Inventor: Koike.

Issued: Jul. 19, 2000

A storage battery charge capacity measuring device for use in an electric vehicle (1) which determines charge capacity based on the terminal voltage of a storage battery (14) measured upon completion of a charging operation, said battery capacity measuring device comprising: means for measuring the terminal voltage across the storage battery (14) at predetermined intervals and determining whether the storage battery (14) is in a surface charge state based on a variation in the measured terminal voltages; means (71) for allowing the storage battery to discharge on a light load when the storage battery (14) is in a surface charge state; and means for determining charge capacity based on the terminal voltage when the surface charge state is eliminated.

European Patent Number GB2371688

Inventor: A. Phillips.

Issued: Jul. 31, 2002

A starter/alternator system for hybrid electric vehicle having an internal combustion engine and an energy storage device has a controller coupled to the starter/alternator. The controller has a state of charge manager that monitors the state of charge of the energy storage device. The controller has eight battery state-of-charge threshold values that determine the hybrid operating mode of the hybrid electric vehicle. The value of the battery state-of-charge relative to the threshold values is a factor in the determination of the hybrid mode, for example; regenerative braking, charging, battery bleed, boost. The starter/alternator may be operated as a generator or a motor, depending upon the mode.

While these battery charging systems designed for use with an electric vehicle may be suitable for the purposes for which they were designed, they would not be as suitable for the purposes of the present invention, as hereinafter described.

SUMMARY OF THE PRESENT INVENTION

A primary object of the present invention is to provide a battery charging system designed for use with an electric vehicle.

Another object of the present invention is to provide an onboard battery charging system designed for use with an electric vehicle.

Yet another object of the present invention is to provide an onboard battery charging system with means to wire the batteries in parallel to allow the batteries to be continuously charged.

Still yet another object of the present invention is to provide an onboard battery charging system with means to wire the batteries in series to allow the batteries to be used with an electric vehicle.

Another object of the present invention is to provide an onboard battery charging system with means to regulate the voltage to prevent against under or over current of the batteries.

Yet another object of the present invention is to provide an onboard battery charging system with means for connection to a single power generator or as necessary, multiple power generators for increase load capacity requirements.

Still yet another object of the present invention is to provide a battery charging system designed for use with an electric vehicle that is simple and easy to use.

Another object of the present invention is to provide a battery charging system designed for use with an electric vehicle that is inexpensive to manufacture and operate.

Additional objects of the present invention will appear as the description proceeds.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the Figures illustrate the cart charging system of the present invention. With regard to the reference numerals used, the following numbering is used throughout the various drawing Figures.

10 cart charging system of the present invention
12 power generator
14 generating means
16 alternator
17 belt
18 alternator output
19 lead
20 lead
21 positive pole
22 battery
23 negative pole
24 wire
26 output from battery bank
28 diode
30 junction box
31 controller
32 DC motor
34 Pot box
36 ground
40 voltage control system

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 7 illustrate the cart charging system of the present invention indicated generally by the numeral 10.

The battery charging system of the present invention improves on the shortcomings of systems of today by providing a charging circuit onboard the vehicle. The onboard charging system of the present invention provides means to continuously charge the batteries without the need to stop the vehicle. In turn, the range of the electrically powered vehicle is greatly increased and down time for external and stationary recharging is greatly decreased.

The battery charging system of the present invention is comprised of a power generator, a distribution system, battery bank, controller and a direct current motor. The wiring of the battery charging system provides means for a charging circuit for onboard electric vehicle batteries, where the batteries are charged in parallel while being used in series.

The voltage controller of the present invention's battery charging system regulates the voltage to flow maintain necessary current and prevents overcharging of the batteries.

To accommodate various load capacity needs, the present invention's battery charging system provides means for connection to a single power generator or as necessary, multiple power generators for increase load capacity.

Figure 1:
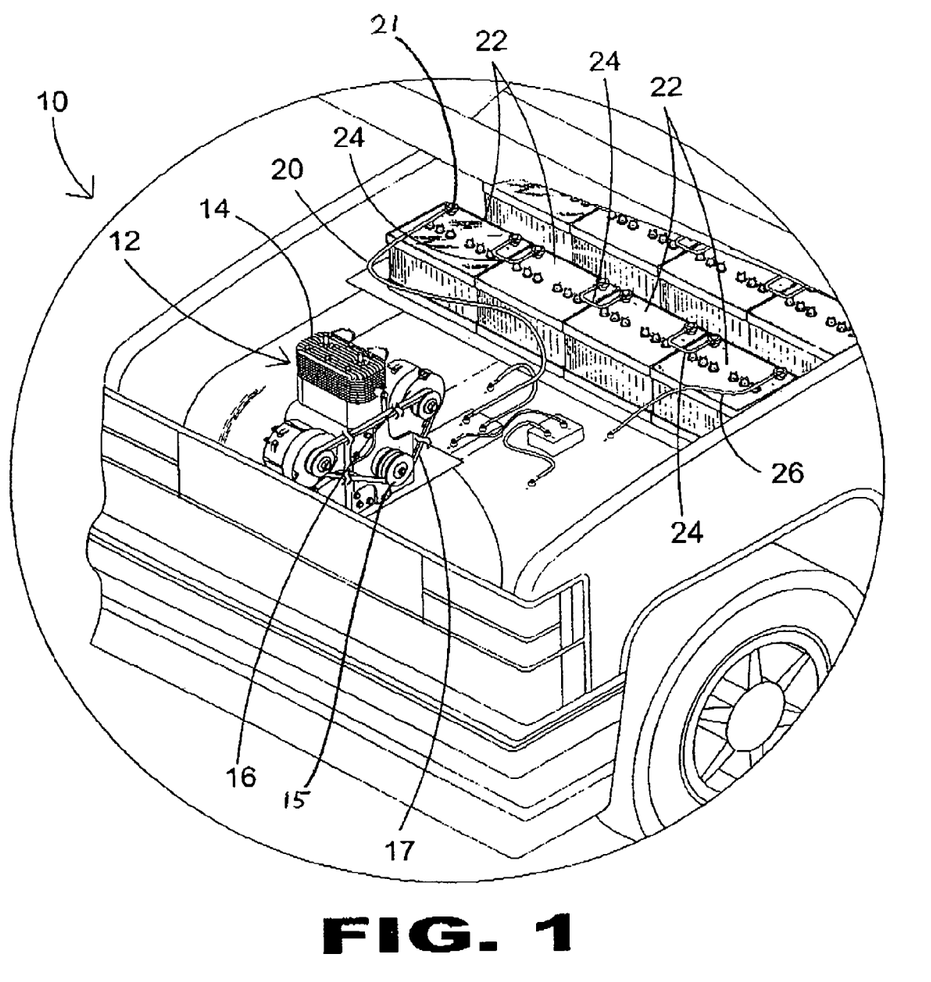
FIG. 1 is an illustrative view of cart charging system of the present invention in use.

FIG. 1 is an illustrative view of cart charging system of the present invention in use. The present invention is an onboard charging system for electric vehicles. Prior art provides electric vehicles that must be stationary at a charging system to replenish the current in the batteries. The range of these electric vehicles is directly proportional to the charging capacity of the batteries and the depletion rate of that charge. Factors such as load and speed will limit the range of an electric vehicle and increase the frequency of charging sessions. The range of an electric vehicle with an onboard charging system is unlimited as the batteries are constantly being charged by the present invention.

The cart charging system 10 of the present invention includes a generator 12 having generating means 14 and a high voltage alternator 16. The generating means 14 includes output 15 connected to one or more alternators 16 via belt 17. As output 15 rotates, rotational energy is converted into electrical energy by the high voltage alternator 16. The alternator 16 has an output 18 for outputting the induced electrical current therefrom. The current output via the output 18 from the alternator 16 is transferred to a plurality of batteries 22, which form a battery bank. Preferably, the batteries 22 are 12-volt batteries that are connected in series to form a battery bank with a battery bank being charged in parallel by an appropriately rated alternator. As the batteries 22 are connected in series, as illustrated the electrical voltage output thereby is 48 volts for each bank with the system generating 96 volts. The batteries 22 each have a positive pole 21 and a negative pole 23 as shown hereinafter with specific reference to FIGS. 4 and 5. The negative pole 23 of the first battery 22 is connected to the alternator casing via lead 19, which is isolated from any common motor ground and thereby each alternator is isolated from all others. The positive pole 21 of the first battery is thus connected to the negative pole 23 of the second battery 22. The third and fourth batteries 22 are connected in the similar fashion. However, the final positive pole 21 of the fourth battery 22 is connected to alternator output 18 via lead 20, for charging purposes and to voltage controller 31 for distribution purposes. Thereafter, the current passes to DC motor 32 for powering the vehicle. As the vehicle is driven, power from the battery bank(s) is diminished. However, the generator 12 causes power to be generated and used to recharge the individual batteries 22 as needed. The power is provided from the alternator 16 to the batteries 22 of the battery bank.

Figure 2:
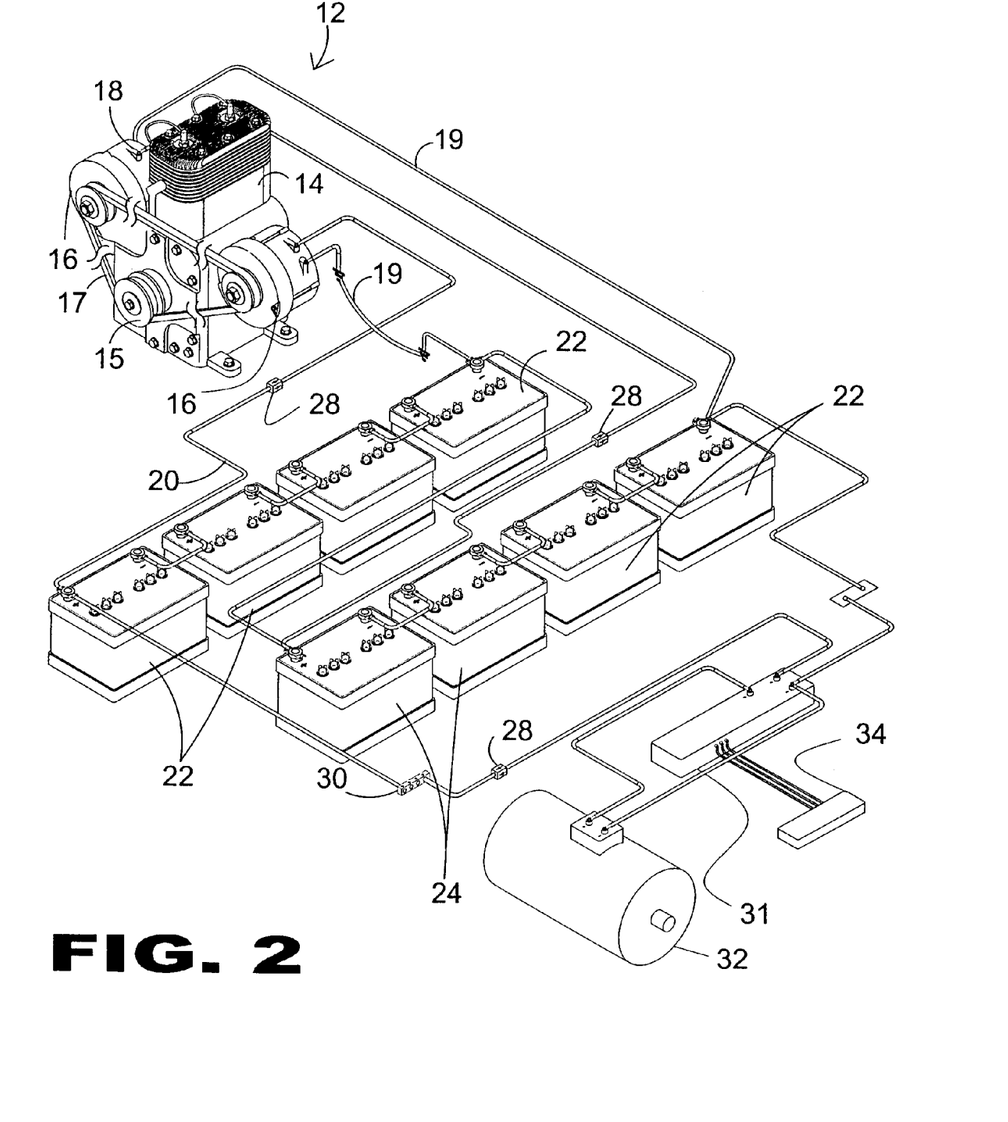
FIG. 2 is an illustrative schematic of the cart charging system of the present invention.

FIG. 2 is an illustrative schematic of the cart charging system of the present invention. The cart charging system 10 of the present invention includes a generator 12 having generating means 14 and a high voltage alternator 16. The generating means 14 of the generator 12 is preferably a 5–30 horsepower generator that is powered by gas, diesel or propane. The generating means 14 includes output 15 connected to one or more alternators 16 via belt 17. As output 15 rotates, rotational energy is converted into electrical energy by the high voltage alternator 16. The alternator 16 has an output 18 for outputting the induced electrical current therefrom. The current output via the output 18 from the alternator 16 is transferred to a plurality of batteries 22, which form a battery bank. As previously described, the batteries 22 are preferably 12 volt batteries that are connected in series to form a battery bank with a battery bank being charged in parallel by an appropriately rated alternator 16 via generator output 18. As the batteries 22 are connected in series, as illustrated the electrical voltage output thereby is 48 volts for each bank. The batteries 22 each have a positive pole 21 and a negative pole 23 as shown hereinafter with specific reference to FIGS. 4 and 5. The negative pole 23 of the first battery 22 is connected to the alternator casing via lead 19, which is isolated from any common motor ground and thereby each alternator is isolated from all others. The positive pole 21 of the first battery is thus connected to the negative pole 23 of the second battery 22. The third and fourth batteries 22 are connected in the similar fashion. However, the final positive pole 21 of the fourth battery 22 is connected to alternator output 18 via lead 20, for charging purposes and to voltage controller 31 for distribution purposes. Thereafter, the current passes to DC motor 32 for powering the vehicle. As the vehicle is driven, power from the battery bank(s) is diminished. However, the generator 12 causes power to be generated and used to recharge the individual batteries 22 as needed. The power is provided from the alternator 16 to the batteries 22 of the battery bank.

As shown herein, the charger includes the power generator 12, which distributes power to the battery bank(s). The system further includes the voltage controller 31, pot box 34 and a direct current motor 32. The alternators 16 are two 48-volt alternators as required by the four 12-volt batteries forming each battery bank. Furthermore, as shown in FIG. 2 there are two battery banks. The batteries 22 within each respective bank are connected in series determining the voltage output and the two battery banks are connected in series for distribution purposes. Thus, as illustrated, each alternator 16 charges four (4) 12-volt batteries via generator output 18. Additionally, the alternators are not grounded to the case of the motor, as they must be isolated from any common ground. Therefore each battery bank is connected to their respective alternator casing via lead 19 and to an isolated ground 36.

As the generating means 14 generates rotational energy, which is converted into electrical energy by each of the alternators 16, the electrical energy is output at the output 18. A connection wire connects each of the outputs 18 to a respective positive pole 21 of a battery in the battery bank. Connected between the output 18 and positive pole 21 is a diode 28 preventing current feedback into the alternator. At the positive pole 21 of the final battery in each battery bank, a further connection wire connects both battery banks at a junction box 30. From the junction box, an output is connected to a voltage control mechanism 40, which ensures proper voltage level exists within the system. The voltage control mechanism 40 includes a controller 31 and a pot box 34 providing current to the DC motor 32 which in turn powers the vehicle.

Figure 3:
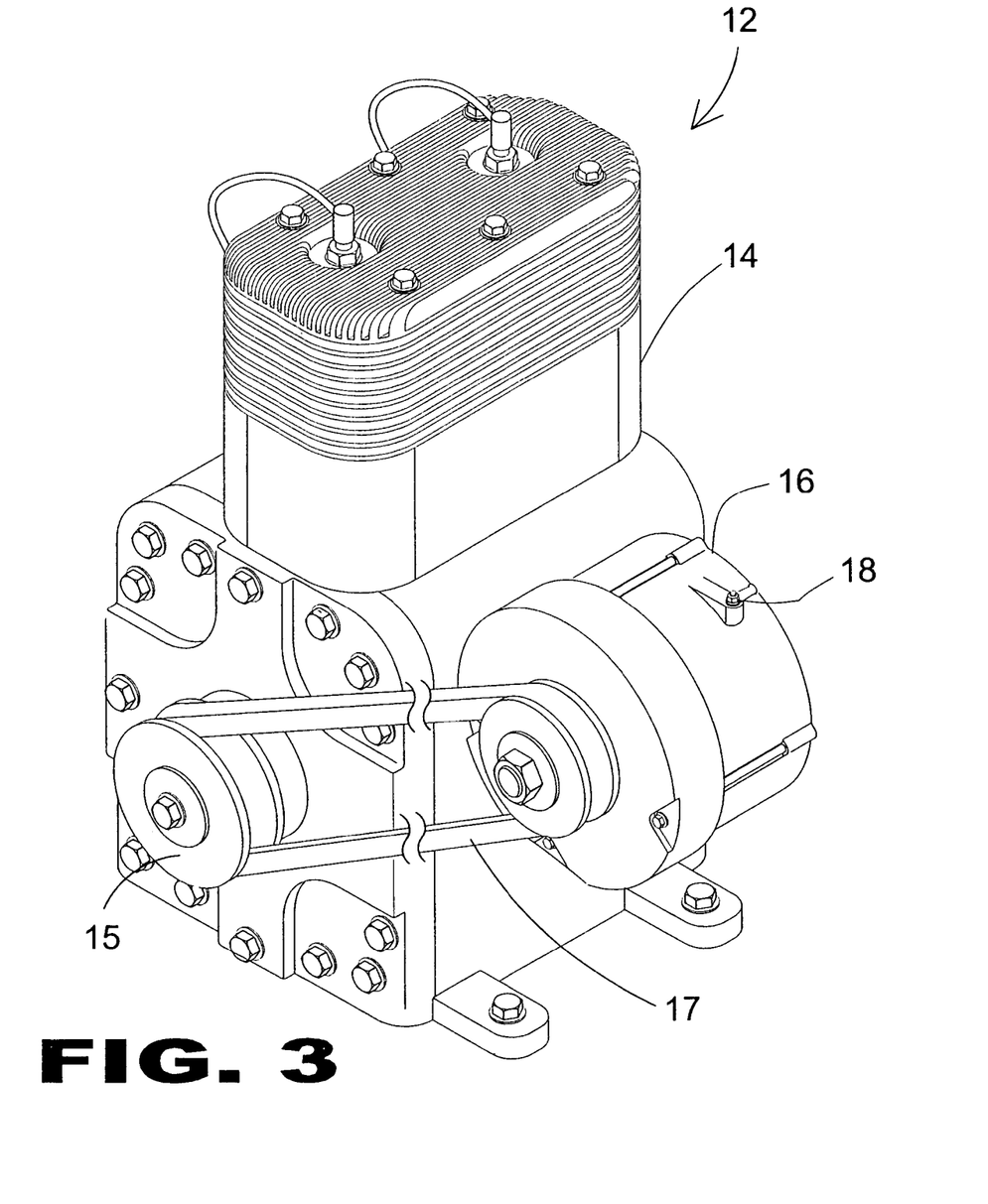
FIG. 3 is an illustrative view of the power generator of the cart charging system of the present invention.

FIG. 3 is an illustrative view of the power generator of the cart charging system of the present invention. The cart charging system 10 of the present invention includes a generator 12 having generating means 14 and a high voltage alternator 16. The generating means 14 of the generator 12 is preferably a 5–30 horsepower generator that is powered by gas, diesel or propane. The generating means 14 includes output 15 connected to one or more alternators 16 via belt 17. As output 15 rotates, rotational energy is converted into electrical energy by the high voltage alternator 16. The alternator 16 has an output 18 for outputting the induced electrical current therefrom. The current output via output 18 from alternator 16 is used to charge a plurality of batteries 22 connected in series and charged by the alternator in parallel with each series forming a battery bank as shown in FIGS. 1 and 2.

The power generator 12 for the onboard charging system is an internal combustion engine and one or more high output alternator 16. A 5 to 30 horsepower gasoline, diesel or propane engine rotates output 15 that drives the one or more generators via belt(s) 17 with the alternator output 18 used to charge an appropriate number of series connected batteries.

Figure 4:
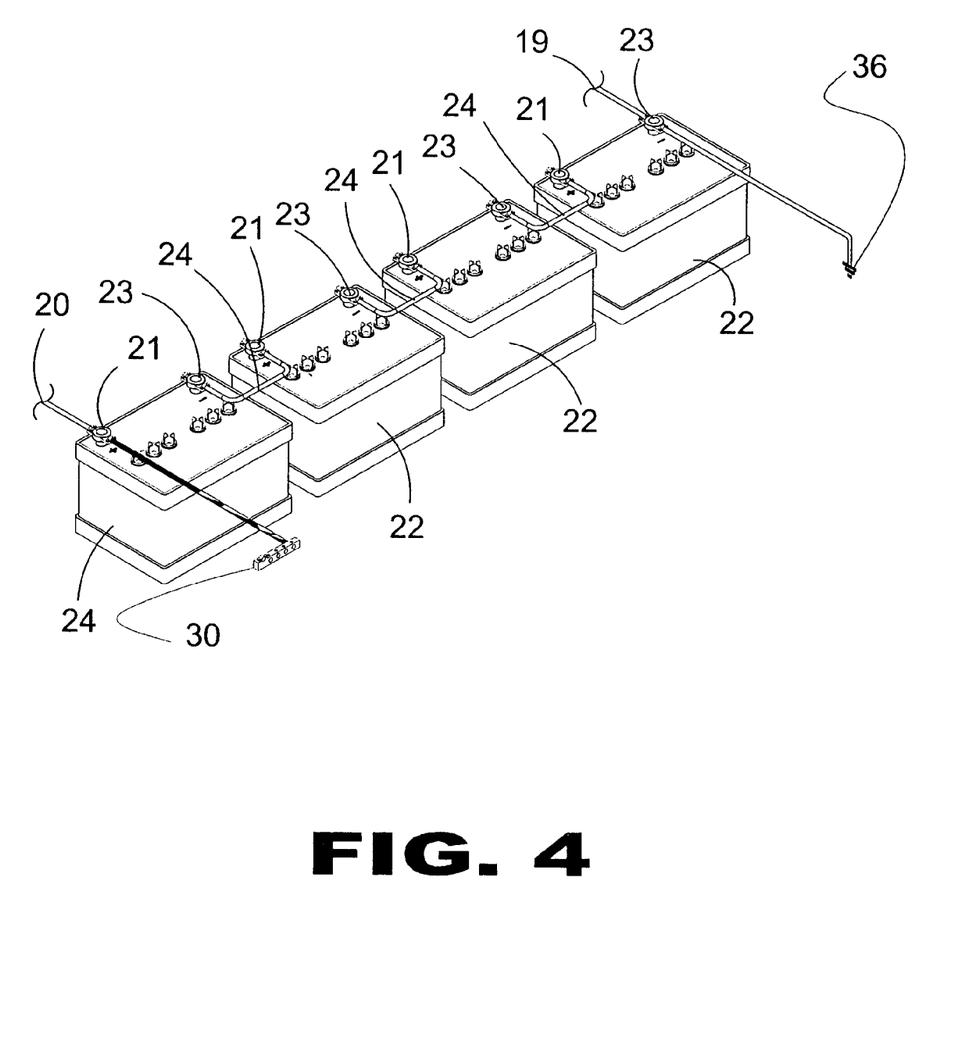
FIG. 4 is an illustrative view of the battery bank of the cart charging system of the present invention.

FIG. 4 is an illustrative view of the battery bank of the cart charging system of the present invention. The current output via the output 18 from the alternator 16 is transferred to a plurality of batteries 22, which form a battery bank. Preferably, the batteries 22 are 12-volt batteries that are connected in series to form the battery bank. As the batteries 22 are connected in series, the electrical voltage output thereby is 48 volts. The batteries 22 each have a positive pole 21 and a negative pole 23 as shown hereinafter with specific reference to FIGS. 4 and 5. The negative pole 23 of the first battery 22 is connected the alternator housing via lead 19 and an isolated ground 36. The positive pole 21 of the first battery is thus connected to the negative pole 23 of the second battery 22. The third and fourth batteries 22 are connected in the similar fashion. However, the final positive pole 21 of the fourth battery 22 is connected to generator output 18 for charging and to voltage controller. Thereafter, the current passes from the bank of batteries to a motor 32 for powering the vehicle. As the vehicle is driven, power from the battery bank is diminished. However, the generator 12 causes power to be generated and used to recharge the individual batteries 22 as needed. The power is provided from the alternator 16 to the batteries 22 of the battery bank.

Depicted in FIG. 4 are the terminals of four batteries connected in series. When connected in series, the output voltage is equivalent to the added sum of each of the batteries rated voltage. In turn, four 12-volt batteries wired in series produces an output voltage of 48 volts.

Figure 5:
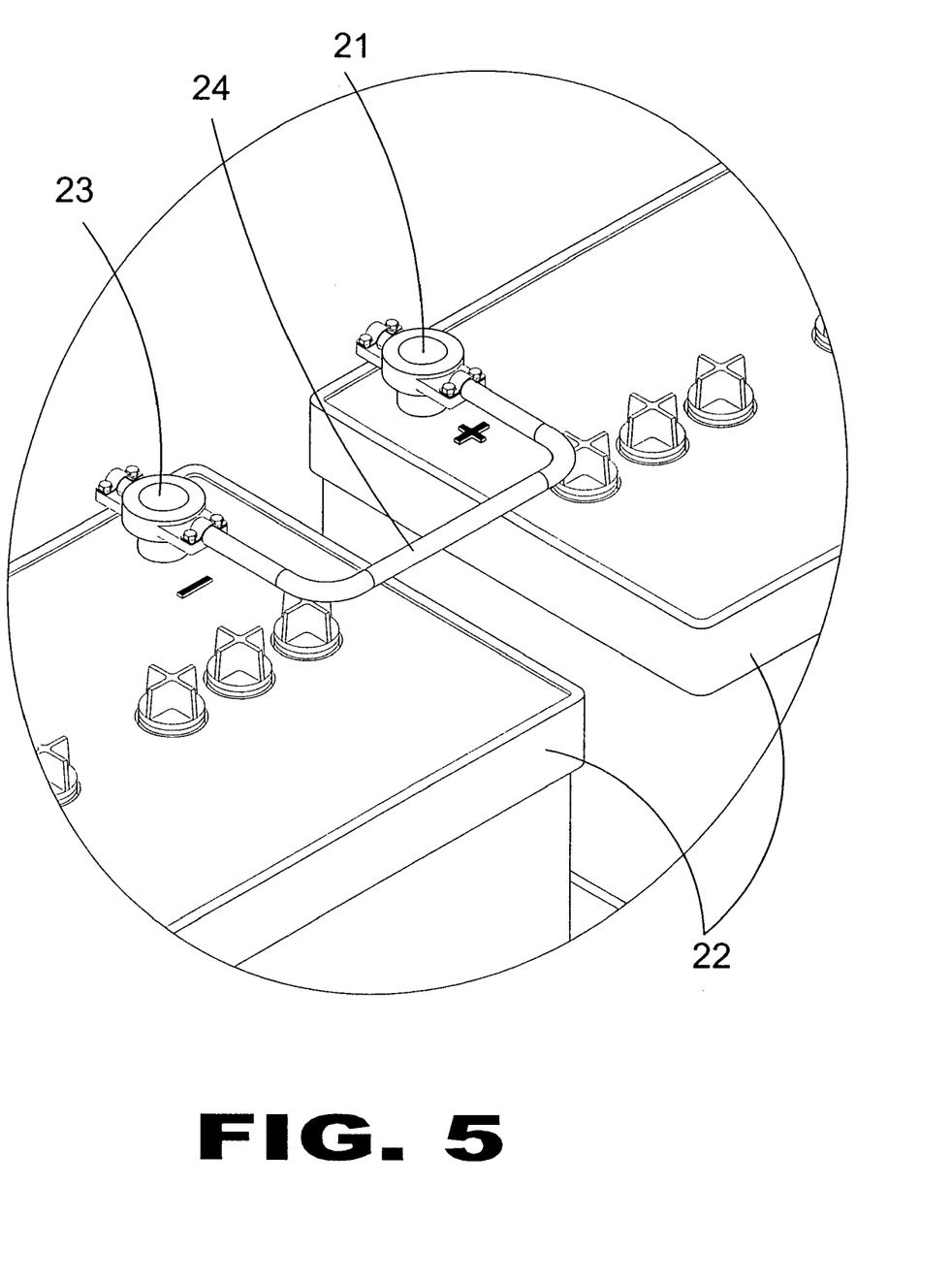
FIG. 5 is an enlarged view of the battery bank of the cart charging system of the present invention connected in series.

FIG. 5 is an enlarged view of series connected batteries. The current output via the output 18 from the alternator 16 is transferred to a plurality of batteries 22, which form a battery bank. Preferably, the batteries 22 are 12-volt batteries that are connected in series to form the battery bank. As the batteries 22 are connected in series, the electrical voltage output is determined by the number of series connected batteries. In terms of the present inventions preferable 12 volt battery four batteries generate 48 volts, 8 batteries generate 96 volts and 12 batteries generate 144 volts, which are all within the scope of the present invention with the determining factor established by the system requirements. The batteries 22 each have a positive pole 21 and a negative pole 23 as shown hereinafter with specific reference to FIGS. 4 and 5. The negative pole 23 of the first battery 22 is connected to the alternator case via lead 19 and isolated ground 36. The positive pole 21 of the first battery is thus connected to the negative pole 23 of the second battery 22. The third and fourth batteries 22 are connected in the similar fashion. However, the final positive pole 21 of the fourth battery 22 is connected to generator out 18 for charging purposes and voltage controller 31 for distribution purposes. Thereafter, the current from the bank of batteries is used to power the load. In this case, a DC motor 32 for powering the vehicle. As the vehicle is driven, power from the battery bank is diminished. However, the generator 12 drives alternator(s) 16 that continuously charges the battery bank to recharge the individual batteries 22 as needed. The power is provided from the alternator 16 to the batteries 22 of the battery bank. Depending on the voltage requirements determines the number of batteries required with each battery having an alternator or a plurality of appropriately rated alternators, such as illustrated in the drawings wherein a 48 volt alternator charges four batteries connected in series with the series forming a battery bank charged in parallel.

Figure 6:
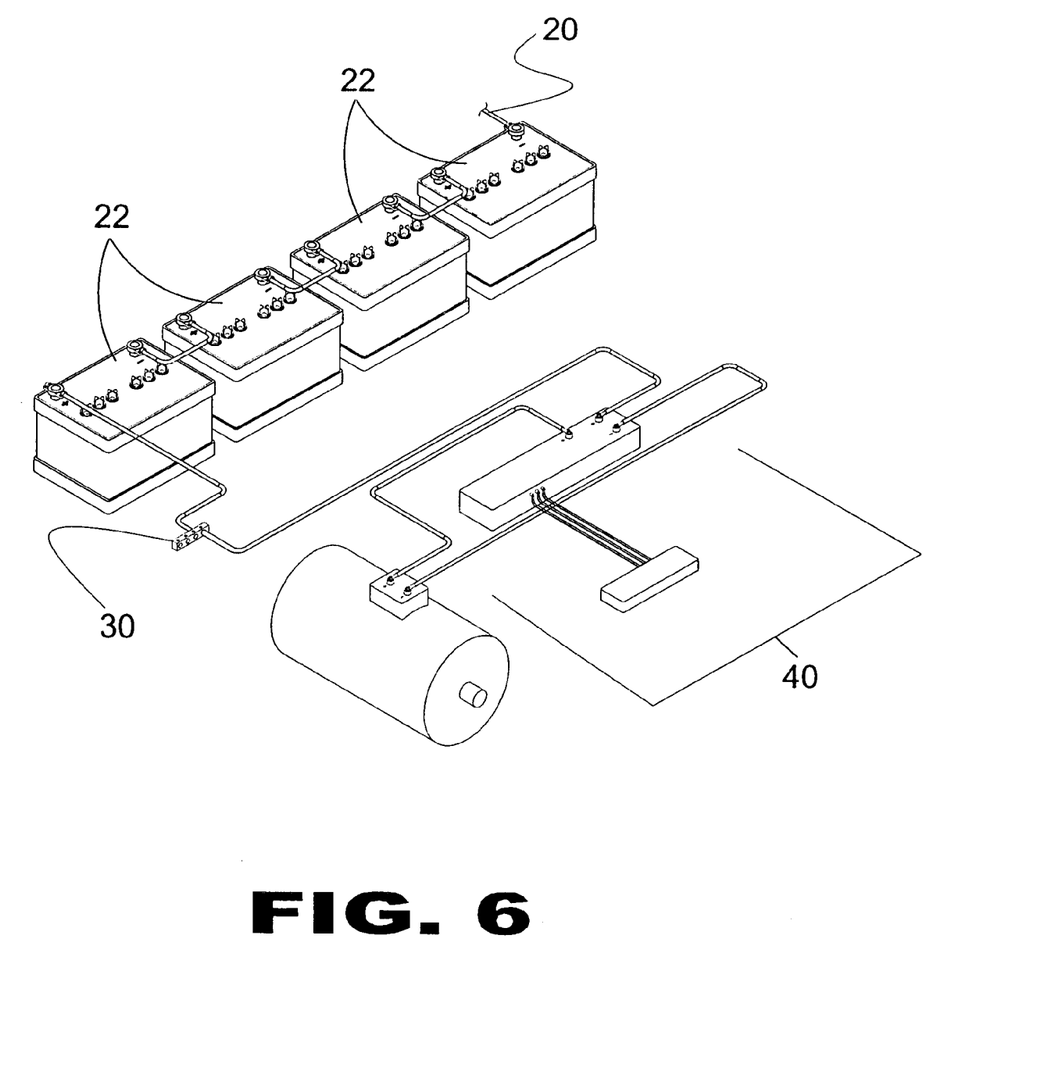
FIG. 6 is an illustrative view of the distribution system of the cart charging system of the present invention.

FIG. 6 is an illustrative view of the distribution system of the cart charging system of the present invention. The current output via the output 18 from the alternator 16 is transferred to a plurality of batteries 22, which form a battery bank. Preferably, the batteries 22 are 12-volt batteries that are connected in series to form the battery bank. As the batteries 22 are connected in series, the electrical voltage output thereby is 48 volts. The batteries 22 each have a positive pole 21 and a negative pole 23 as shown hereinafter with specific reference to FIGS. 4 and 5. The negative pole 23 of the first battery 22 is connected to the alternator housing via lead 19 and isolated ground 36. The positive pole 21 of the first battery is thus connected to the negative pole 23 of the second battery 22. The third and fourth batteries 22 are connected in the similar fashion. However, the final positive pole 21 of the fourth battery 22 is connected to alternator out 18 for charging purposes and voltage controller 31 for distribution purposes. Thereafter, the current passes from the bank of batteries to DC motor 32 for powering the vehicle. As the vehicle is driven, power from the battery bank is diminished. However, the generator 12 causes power to be generated and used to recharge the individual batteries 22 as needed. The power is provided from the alternator 16 to the batteries 22 of the battery bank.

As shown herein, the charger includes the power generator 12, which distributes power to the battery bank. The system further includes the voltage controller 31, a potentiometer 34 and DC motor 32. The alternators 16 are two 48-volt alternators. Furthermore, as shown in FIG. 2 there are two battery banks. The batteries 22 within each respective bank are connected in series and the two battery banks are connected in parallel. Thus, each alternator 16 charges four (4) 12-volt batteries. Additionally, the alternators are not grounded to the case of the motor, as they must be isolated from any common ground.

As the generating means 14 generates rotational energy, which is converted into electrical energy by each of the alternators 16, the induced electrical energy is output at the output 18. A connection wire connects each of the outputs 18 to a respective positive pole 21. Connected between the output 18 and the positive pole 21 is a diode 28 to prevent feedback into the alternator. As previously stated, the positive pole 21 of the final battery in each battery bank, a further connection wire connects both battery banks at a junction box 30. From the junction box, an output is connected to a voltage control mechanism 40 for use by DC motor 32. The voltage control mechanism 40 includes a controller 31 and a pot box 34 supplying current to the DC motor 32, which in turn powers the vehicle.

Figure 7:
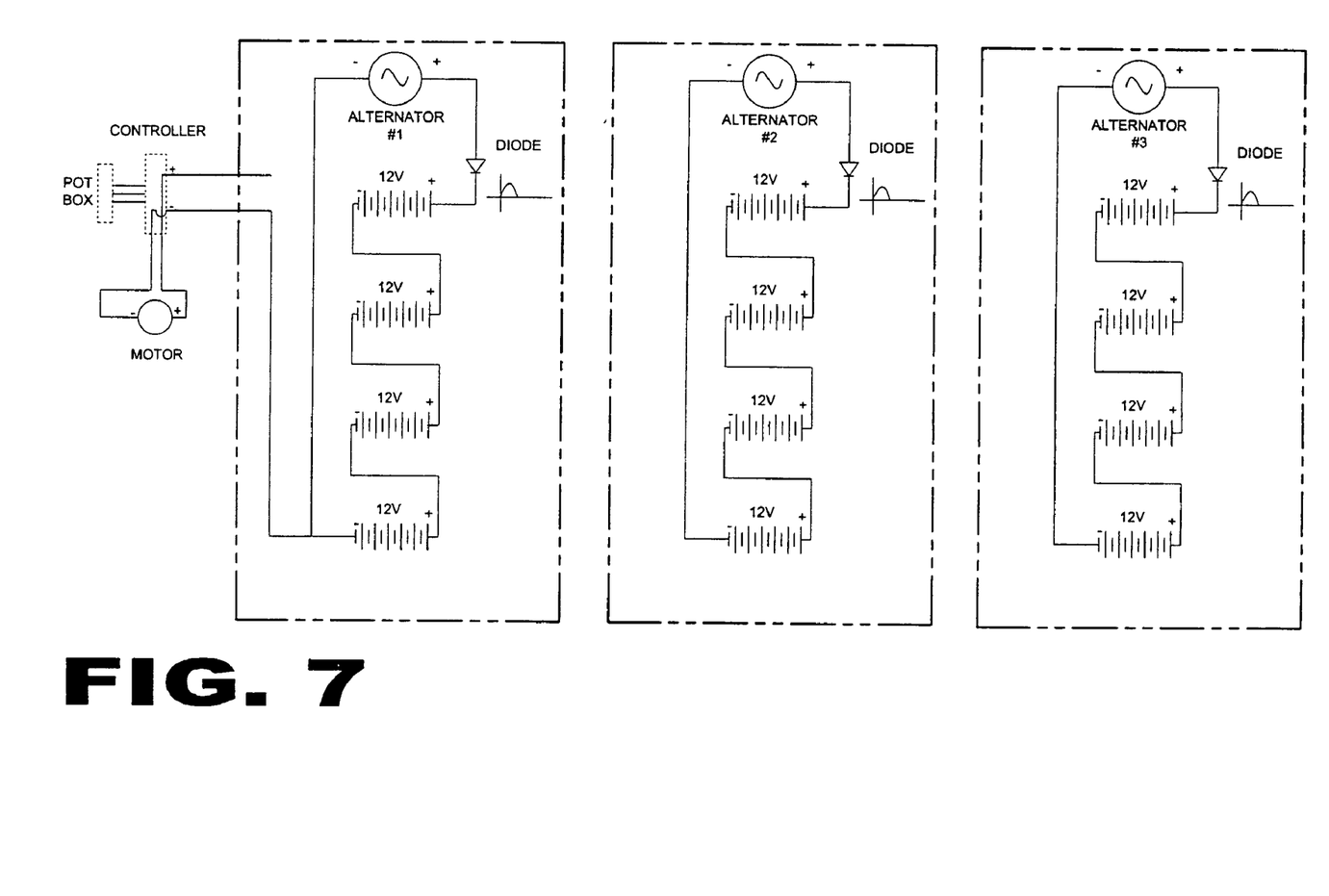
FIG. 7 is an electrical schematic of the cart charging system of the present invention.

FIG. 7 is an electrical schematic of the cart charging system of the present invention. The present invention can provide multiple alternators and battery banks. FIG. 7 illustrates three alternators charging individual battery banks of four batteries. The battery banks are then connected in series to the controller system junction blocks. An alternate configuration includes using one alternator per battery, this can be done with 12, 24 and 48-volt alternators.

The current output via the output 18 from the alternator 16 is transferred to a plurality of batteries 22, which form a battery bank. Preferably, the batteries 22 are 12-volt batteries that are connected in series to form the battery bank. If the batteries 22 are connected in series, the electrical voltage output thereby is 144 volts. The batteries 22 each have a positive pole 21 and a negative pole 23 as shown hereinafter with specific reference to FIGS. 4 and 5. The negative pole 23 of the first battery 22 is connected to the generator housing via lead 19. The positive pole 21 of the first battery is thus connected to the negative pole 23 of the second battery 22. The third and fourth batteries 22 are connected in the similar fashion. However, the final positive pole 21 of the fourth battery 22 is connected to generator output 18 for charging purposes and a voltage controller for distribution purposes. Thereafter, the current passes from the bank of batteries to DC motor 32 for powering the vehicle. As the vehicle is driven, power from the battery bank is diminished. However, the generator 12 causes power to be generated and used to recharge the individual batteries 22 as needed. The power is provided from the alternator 16 to the batteries 22 of the battery bank.

As shown herein, the charger includes the power generator 12 which distributes power to the battery bank. The system further includes the voltage controller 31, pot box 34 and a direct current motor 32. The alternators 16 are two 48-volt alternators having the ability to charge four 12-volt batteries. Furthermore, as shown in FIG. 2 there are two battery banks. The batteries 22 within each respective bank are connected in series and the two battery banks are connected in series. Thus, each alternator 16 charges four (4) 12-volt batteries. Additionally, the alternators are not grounded to the case of the motor, as they must be isolated from any common ground.

As the generating means 14 generates rotational energy, which is converted into electrical energy by each of the alternators 16, the electrical energy is output at the output 18. A connection wire connects each of the outputs 18 to a respective positive pole 21 of a final battery in the battery bank. Connected between the output 18 and positive pole 21 is a charging diode 28. This prevents current feedback into the alternator. At the positive pole 21 of the final battery in each battery bank, a further connection wire connects both battery banks at a junction box 30. From the junction box, an output is connected to a voltage control mechanism 40 which ensures proper voltage level exists within the system. The voltage control mechanism 40 includes a controller 31 and a pot box 34. Thereafter, the current is provided to the DC motor 32 which in turn powers the vehicle.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A charging mechanism aboard an electrically powered vehicle comprising:
    a) means comprising an engine driving first and second alternators for generating electrical current;
    b) means connected to said generating means for distributing said generated current;
    c) first and second battery banks connected in series, each battery bank formed from a plurality of batteries connected in series, each said battery bank having a positive terminal and a negative terminal;
    d) means for charging said batteries comprising the positive terminal of the first battery bank being connected to an output of said first alternator and said negative terminal of said first battery bank being connected to a first alternator ground isolated from a common motor ground, the positive terminal of the second battery bank being connected to an output of said second alternator and said negative terminal of said second battery bank being connected to a second alternator ground isolated from said common motor ground, the first and second alternator grounds being electrically isolated from each other and the common motor ground;
    e) means for controlling a voltage level provided by said battery banks to maintain a predetermined voltage level; wherein upon said controlling means detecting a voltage level below said predetermined voltage level, said controlling means causes said generating means to generate electric current to charge said battery banks;
    f) a DC motor connected to said battery banks through said controlling means for powering said vehicle, said controlling means being connected to said positive terminal of said first battery bank and said negative terminal of said second battery bank, said motor thereby receiving power from said battery packs in series.

2. The charging mechanism as recited in claim 1, wherein each battery bank is formed from four batteries.

3. The charging mechanism as recited in claim 2, further comprising a junction box for connecting each output from said battery banks to said controlling means.

4. The charging mechanism as recited in claim 3, wherein each respective battery forming a battery bank is a 12 volt battery thereby resulting in each respective battery bank having a combined voltage of 48 volts.

5. The charging mechanism as recited in claim 4, wherein each alternator generates 48 volts.

\* \* \* \* \*